United States Patent [19]

Wirz

[11] Patent Number: 4,559,744
[45] Date of Patent: Dec. 24, 1985

[54] PROCESS FOR MACHINING A SPUR GEAR BY MEANS OF A ROTATING GEAR-LIKE TOOL

[75] Inventor: Walter Wirz, Pfäffikon, Switzerland

[73] Assignee: Reishauer AG, Wallisellen, Switzerland

[21] Appl. No.: 744,657

[22] Filed: Jun. 14, 1985

Related U.S. Application Data

[63] Continuation of Ser. No. 342,960, Jan. 26, 1982, abandoned.

[30] Foreign Application Priority Data

Jan. 27, 1981 [CH] Switzerland .......................... 516/81

[51] Int. Cl.$^4$ ............................................. B24B 19/00
[52] U.S. Cl. ................................. 51/287; 51/105 GG; 51/165.77; 409/12; 409/49
[58] Field of Search ............... 51/26, 52 R, 52 HB, 51/95 R, 95.6 H, 95 TG, 105 GG, 95 LH, 105 HB, 165.77, 287, 288; 409/12, 35, 36, 37, 49

[56] References Cited

U.S. PATENT DOCUMENTS

| | | | |
|---|---|---|---|
| 1,759,333 | 5/1930 | Wildhaber | 51/287 X |
| 2,607,175 | 8/1952 | Osplack | 51/287 |
| 3,060,643 | 10/1962 | Wildhaber | 51/287 X |
| 3,085,369 | 4/1963 | Findley | 51/287 X |
| 3,092,935 | 6/1963 | Daniel | 51/287 X |
| 3,417,510 | 12/1968 | Wildhaber | 51/287 X |
| 3,602,209 | 8/1971 | Bocker | 51/287 X |
| 3,994,098 | 11/1976 | Konersmann et al. | 51/26 |
| 4,142,333 | 3/1979 | Fivian | 51/287 |
| 4,195,446 | 4/1980 | Angst | 51/105 GG |
| 4,329,096 | 5/1982 | Herscovici | 51/95 GH |

FOREIGN PATENT DOCUMENTS

655487 4/1979 U.S.S.R. ............................. 409/35

*Primary Examiner*—Robert P. Olszewski
*Attorney, Agent, or Firm*—Sughrue, Mion, Zinn, Macpeak, and Seas

[57] ABSTRACT

In a process for machining a spur gear by using a grinding worm having a curved tooth thickness smaller than the final measurement of the curved tooth gap of the spur gear to be produced, the grinding worm is first directed radially towards the spur gear until the desired distance between the axes is reached. Subsequently, a relative circular feed movement is carried out consisting of a positive or negative additional rotating movement of the gear or the worm. This additional rotating movement is superimposed on the corresponding basic revolution of the gear or the worm. In this way, first one flank and subsequently the other flank of each gear tooth is machined to its final dimension. With this process, a full linear contact exists between the grinding worm and the tooth flank of the gear during roughing independent of the amount of material to be machined. Due to the existing play, an effective cooling is possible so that high grinding outputs can be achieved.

5 Claims, 5 Drawing Figures

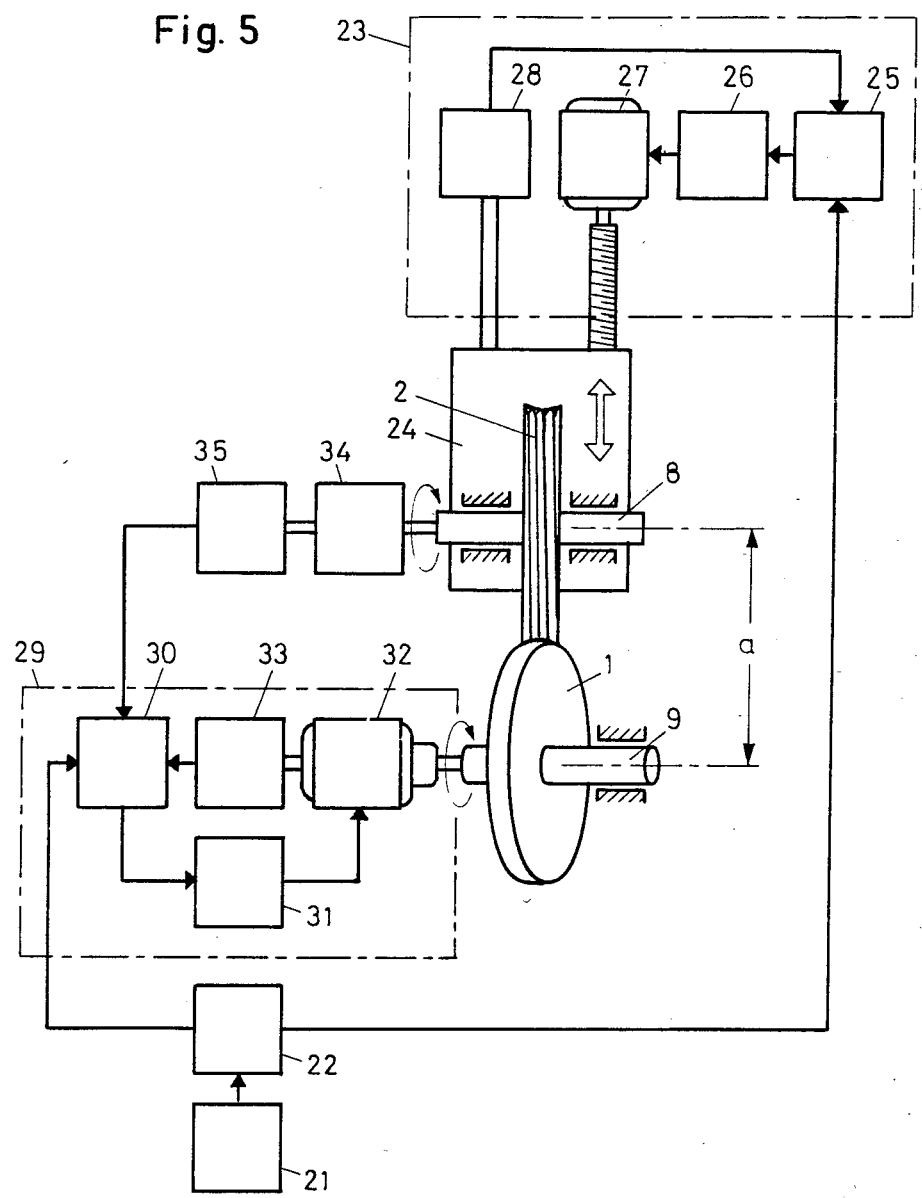

PROCESS FOR MACHINING A SPUR GEAR BY MEANS OF A ROTATING GEAR-LIKE TOOL

This is a continuation of application Ser. No. 342,960, filed Jan. 26, 1982, now abandoned.

BACKGROUND OF THE INVENTION

The present invention is directed to a gear machining process wherein a rotating gear-like or worm-shaped tool is radially moved into engagement with a gear-type workpiece with the shape of the teeth of the tool and workpiece being such as to prevent engagement of said teeth until a subsequent relative circular feed movement is performed in opposite directions to machine first one flank of the workpiece teeth and then the other flank thereof.

In known processes of continuous gear machining by means of immersion scraping, immersion grinding and immersion honing of cylindrical spur gears, the workpiece is engaged with a gear-like, rotatably driven scraping or honing tool having a globoidal or hyperboloidlike shape in such a way that the desired gear geometry is obtained on the workpiece with a radial advance movement between the tool and the workpiece when the distance of the axes of the tool and the workpiece, which are crossed towards each other, has reached the final value or the desired distance between axes which corresponds to the profiles of the tool and those of the finished machined workpiece.

An advantage of this process, for example, in comparison with the well known continuous gear rolling grinding with a cylindrical grinding worm, is seen in the fact that the desired workpiece geometry can be produced by a single movement between tool and workpiece, i.e. the immersion feed, since the line of engagement between the tool and the workpiece extends across the entire width of the workpiece when the rated axis distance (desired distance between axes) is reached and that a high material removing capacity can be reached due to the great length of the engagement with the workpiece. Since an additional axial machining feed is thereby eliminated, the process is very economical. Such a known process, as described above is covered by the German Disclosure Publication No. 25 16 059 which discloses the use of a rotating, gear-like tool for the production or machining, particularly for the grinding, of the teeth of straight or oblique spur gears. The tool consists of a grinding worm in the described embodiment.

As is generally known, no definition-bound difference is made between a gear and worm in gear technology. The latter represents, in the technical sense, an oblique gear which may have a small number of teeth, even one. For this reason, the term "gear-like tool" comprises worms as well as other gears which may have teeth inside and outside. The machining can be effected through chipping, removing and also reshaping.

The prerequisite for the grinding with only one radial advance movement is the covering of the teeth of the tool with those of the workpiece, i.e. the joint tooth engagement must extend from the one face of the workpiece to the other whereby the tool has a hyperboloid of globoidal-like shape. The tool, in this instance the grinding worm, must be circumferentially shaped in such a manner that it forms a correct tooth engagement with the teeth of the workpiece when the rated production axis distance is reached. In case of tooth corrections, the tool must be provided with these corrections, for example, corrections for tip relief profile ease-off and base relief profile ease-off.

The machining of the workpiece according to the known process of pure cutting-in has a number of disadvantages. At the beginning of the machining, the workpiece has a more or less large dimension which is to be machined, i.e. there is a deviation between the real shape of the workpiece and the shape which the workpiece will have at the end of the immersion machining and to which the tool shape is coordinated.

This discrepancy between tool and workpiece shape, which will only disappear with the removal of the undesired portions of the workpiece, i.e. when the machining process is terminated, has the effect that, at the beginning of the machining, very unfavorable engagement conditions with unsymmetrical, point-shaped engagements exist depending on the height of the workpiece to be machined which run counter to a high material removing capacity. This means that this process is only superior to other processes with workpieces having a relatively small amount to be machined which requires a correspondingly high precision of the preliminary machining.

Furthermore, the non-uniform material removal leads to undesirable burned spots with a fast feed. This is particularly true because the cooling is insufficient between the tool and the workpiece upon immersion since the teeth of the tool fully fill the tooth gaps of the workpiece and there is no space for the cooling agent.

SUMMARY OF THE INVENTION

The present invention provides a new and improved process by which the above-mentioned disadvantages are avoided. With the present process is is possible to effect the machining of the workpiece in such a fashion that, even with a relatively large dimension to be machined, a linear engagement is possible between the tool and the workpiece thereby achieving optimum chip removal during the full period of the machining operation. Furthermore, the cooling possibilities with the present process are improved between the tool and the workpiece.

The present invention provides a new and improved process for machining the teeth of a rotating gear workpiece by means of at least one rotating worm-shaped tool which can be moved toward engagement with the workpiece and upon reaching the desired distance between the axes of the tool and workpiece will rest against the workpiece with the ratio of the revolutions corresponding to a basic revolution ratio resulting from the ratio of the number of teeth of the workpiece and tool, comprising radially feeding said tool having a curved tooth thickness smaller than the final measurement of the width of the curved tooth gap of the workpiece to be produced, relative to the said workpiece until the desired distance between said axes is reached and subsequently performing a relative circular feed movement consisting of a positive and negative additional rotating movement of one of said workpiece or tool which is superimposed on the corresponding basic revolution so that first one flank of the teeth of said workpiece and, subsequently, the other flank of said teeth are machined.

The present invention is also directed to a new and improved apparatus for carrying out the foregoing process wherein drive means are provided for rotating the tool or workpiece, feed drive means are provided for relative feeding and return movements between the workpiece and the tool and additional drive means are provided to produce an additional rotating movement of the workpiece or the tool.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 5 is a schematic view of the apparatus for the implementation of the process according to the present invention.

DETAILED DESCRIPTION OF THE INVENTION

Figure 1:
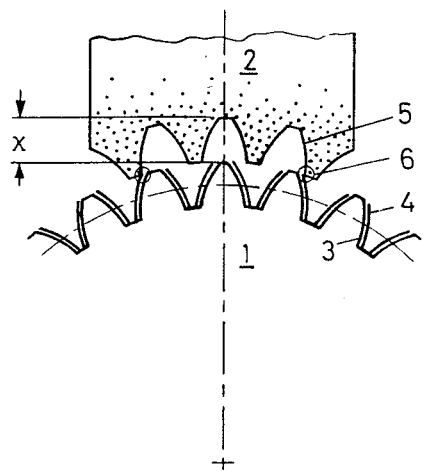
FIG. 1 is a schematic view showing the engagement conditions between a spur gear and a grinding worm according to a prior art immersion process described herein.

The unfavorable engagement characteristics as caused by the pure immersion grinding of a cylindrical spur gear 1 by means of a globoidal-shaped grinding worm 2 are shown in FIG. 1. The finished profile of the gear to be produced is indicated at 3 and the crude tooth flanks of the workpiece are indicated at 4. The profile shape 5 of the known worm 2 is designed in such a fashion that the exact finished profile 3 of the gear 1 develops when the rated production axis distance is reached between the workpiece and the tool whereby possible tooth corrections, such as tip relief profile ease-off and base relief profile ease-off as well as longitudinal crowning, are taken into consideration.

At the beginning of the immersion process in FIG. 1, no linear contact is initially developed but only a one or two-point contact as indicated at the circled points 6. The desired favorable conditions of the profile rolling grinding, i.e. the linear contact, only occur when the finished dimension of the gear is achieved, i.e. when the grinding worm 2 has been radially introduced by the entire amount x. The prior art process has this characteristic because the engagement line is not a straight one but a line or area curved in space. (It should be pointed out that only the involute tooth system has the feature of correct engagement with a straight line as the engagement line, even with a changing distance between the axes.) Therefore, there is only a point contact in all phases of preliminary grinding. Thus, considerable heating is produced even with a reduced quantity of metal being removed and, as a result, burned spots occur on the finished ground gear.

Figure 2:
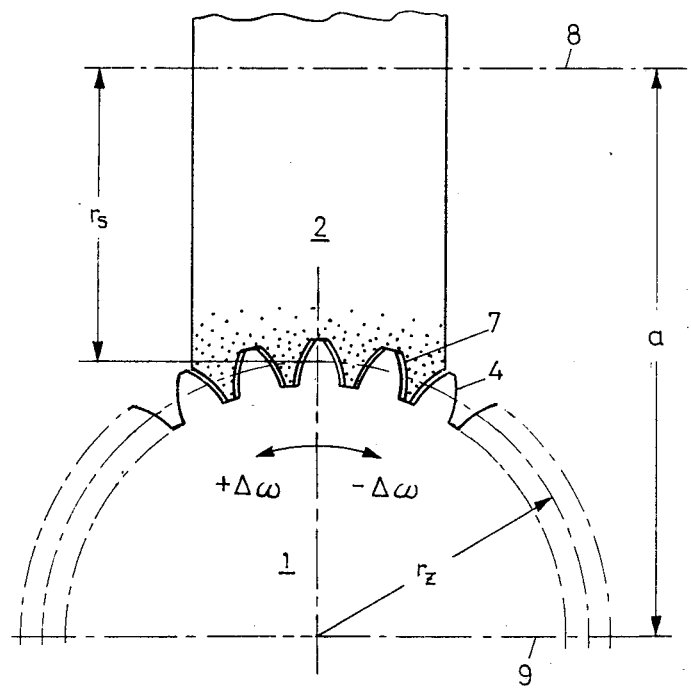
FIG. 2 is a schematic view showing the engagement conditions with the process according to the present invention.
Figure 3:
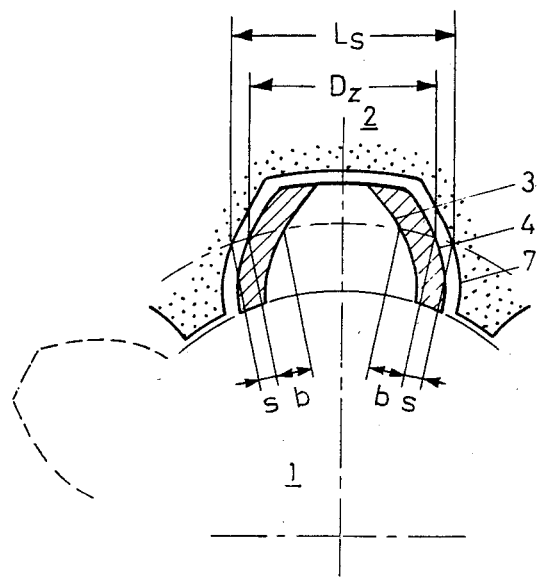
FIG. 3 is an enlarged detailed view of a portion of FIG. 2.

If, in accordance with the present invention as shown in FIGS. 2 and 3, the profile 7 of the grinding worm 2 is selected in such a manner that its curved tooth gap $L_s$ is larger or at least equally as large as the curved tooth thickness $D_z$ of the gears, i.e. $L_s \geq D_z$; or, expressed in an analogous manner as a function of the curved tooth thickness $D_s$ of the tool and of the curved tooth gap $L_z$ of the gear: $D_s \geq L_z$, then the grinding worm 2 can be immediately moved to the full depth until the rated production axis distance "a" is reached between the grinding worm axis 8 and the spur gear axis 9 without incurring contact with the tooth flanks 4 of the workpiece which are still raw. At this point, the rotating tool 2 and the rotating workpiece 1 are in the correct position for tooth engagement whereby the ratio of the revolutions corresponds to a basic revolution ratio resulting from the ratio of the two numbers of teeth of the workpiece and tool.

Now, a relative circular advance motion is carried out between the workpiece and the tool which consists of a positive and subseqently a negative additional rotating movement of the workpiece or of the tool, which additional rotating movement is superimposed on the corresponding basic rotation of the workpiece or the tool. In this way, first the one and then the other tooth flanks of the workpiece are successively ground.

Figure 4:
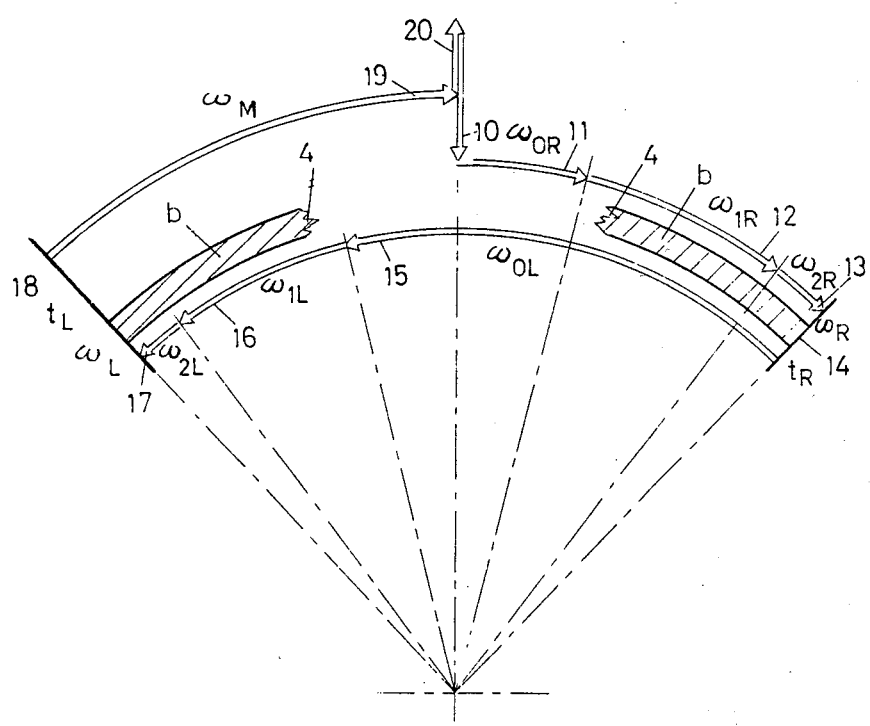
FIG. 4 is a schematic diagram showing the individual steps of the operation for machining a spur gear.

The transfer motion program for the machining is shown in FIG. 4 and is broken down into the following steps wherein the first step is indicated by the transfer step symbol 10:

Transfer Step 10—The grinding worm of tool meshes with the workpiece to the full depth, i.e. a feed movement is effected from the center of the pre-machined tooth gap of the workpiece, until the rated production axis distance "a" is reached. No machining takes place during step 10.

Transfer Step 11—The workpiece is now moved through an angle of rotation $\omega_{0R}$ at a rapid traverse rate until the tooth flank almost touches the grinding worm flank. This additional rotating movement through the angle $\omega_{0R}$ is superimposed on the basic rotation of the workpiece, i.e. its rotation is somewhat accelerated. The amount of the dead angle of movement $\omega_{0R}$ could be measured, for example, by a contact sensor.

Transfer Step 12—Now the actual machining of the right tooth flank takes place beginning with the rough finishing which corresponds to a relative rotation $\omega_{1R}$.

Transfer Step 13—The right flanks are subjected to final machining or smooth finishing through the range of the angle of rotation $\omega_{2R}$.

Transfer Step 14—In the righthand final position which corresponds to an angle of rotation $\omega_R$, the rotating advance ceases for the duration $t_R$ during one of several workpiece rotations for the prupose of grinding-out and sparking-out.

Transfer Step 15—This step comrpises a reverse rotation through the center position and until contact is made of the lefthand tooth flank of the workpiece with the corresponding grinding worm flank. Overall, the reverse rotation through the dead angle of movement $\omega_{0L}$ takes place at a rapid traverse rate. The rotation of the workpiece is, accordingly, somewhat delayed.

Transfer Steps 16 to 18—In a manner analogous to the righthand flanks, the lefthand tooth flanks are now rough ground and smooth ground (rotating angles $\omega 1L$ and $\omega_{2L}$) whereupon the rotational advance ceases at the lefthand final position $\omega_L$ whole workpiece rotation takes place during the period $t_L$.

Transfer Step 19—The workpiece is now accelerated through the angle of rotation $W_M$ until the central position is reached for the removal of the tool.

Transfer Step 20—The last operational step comprises the radial separation of the tool and workpiece.

In a specific machining example, the grinding worm was given such a profile that the raw workpiece fits into the grinding worm profile with a total rotational play of 0.2 mm, i.e. 0.1 mm play "s" per side. The raw gear has a total machining dimension of 2b=0.4 mm in the spur cut; this means that a machining dimension "b" of 0.2 mm is to be ground off on each flank. As a result, with the grinding worm at full depth, the workpiece, measured at the circumference, must be rotated in each direction by 0.3 mm relative to its central position so that the desired curved tooth finished dimension is reached.

This corresponds, when expressed as a function of the pitch radius $r_z$ of the workpiece, to a rotation of the latter by $$\Delta\omega = (s+b)/r_z$$

The play "s" and the machining dimension "b" per tooth flank is measured in the spur cut and in the circumferential direction of the gear. Instead of the rotation of the gear (workpiece), an equivalent rotation of the grinding worm can also be provided.

For the trimming of the grinding worm, a diamond gear is used whose curved tooth thickness, measured on the pitch circle, is smaller than or equal to the desired width of the curved tooth gap of the grinding worm. Also the diamond gear is initially introduced to the full depth and then, proceeding from the central position, is rotated once in the positive and once in the negative sense of rotation by an angle of $\Delta\lambda$. This additional rotating movement is again superimposed on the basic rotating motion of the diamond gear, i.e. it is mutually somewhat accelerated and subsequently somewhat delayed.

In this way, a diamond gear is simulated which has a curved tooth thickness in the spur cut larger by $2 \cdot \Delta\lambda \cdot r_d$ than actually exists. ($r_d$ indicates the pitch radius of the diamond gear.) $\Delta\lambda$ is expediently selected in such a way that the desired curved tooth width develops on the grinding worm. In general, the two additional rotating angles $\Delta\omega$ (for the gear machining) and $\Delta\lambda$ (for the trimming with the diamond gear) are not of the same size.

The new process according to the present invention has the following advantages in comprison with the processes used previously:

(1) There is a full linear contact during roughing between the grinding worm and the tooth flank of the gear independent of the material surplus.

(2) There is no dependence anymore between the curved tooth thickness of the ground gear and the curved tooth thickness of the trimming gear. The desired curved tooth thickness of the workpiece is simply set on the control of the machine-tool which will be described below. Due to the possibility of the re-lapping of the diamond gears without influencing the flank diameter of the gears to be ground, the diamond gears have a longer service life.

(3) The grinding worms can be used for longer periods since the tooth flanks can be trimmed several times before a new depth must be set.

(4) Finally, there are more effective cooling possibilities due to the existing play so that very high grinding output can be achieved.

A system for the performance of the process according to the invention is shown in FIG. 5. This system has an input unit 21 for the tool and workpiece parameters as well as for the machining data. A feed generator 2 supplied by the input unit 21 acts on a bearing circuit 23 to produce the forward and return motion of the tool carriage 24 on which the grinding tool 2 rests. The bearing circuit 23 is comprised of the controller 25, the servo-amplifier 26, the carriage advance motor 27 and the linear measuring system 28.

The feed generator 22 is also connected with a circuit 29 to produce the rotating motion of the workpiece 1. This circuit 29 is comprised of the controller 30, a servo-amplifier amplifier 31, the workpiece motor 32 and a rotating angle transmitter 33. The signals of the feed generator 22 and of the rotating angle transmitter 35 which is connected with the grinding motor 34 form together the rated value of the workpiece rotation.

When the rated production axis distance "a" is reached, the globoidal or hyperboloid-shaped grinding worm 2 comes to rest closely against the gear 1. Depending on the angle of inclination and direction of tool and workpiece, the axis crossing angle can amount from 0° to 90°.

The following data are entered into the input unit 21: the thread or tooth numbers of the tool and of the workpiece, the curved tooth thickness of the profiling tool, the rated curved tooth thickness of the workpiece, the rated axis distance between workpiece and tool, the feed, roughing and smoothing paths in the feed direction of the tool carriage for the preliminary profiling of the tool or the preliminary machining of the pre-toothed workpiece. Furthermore, there are entered into the input unit: the speeds in the individual feed or cross-feed phases, the feed, roughing the smoothing angles and feed, roughing and smoothing angle speeds for the additional rotating movement of the tool or of the workpiece as well as dwell times after the termination of the machining feed movements.

Instead of driving the tool and the workpiece with separate motors, there could also be a joint drive. In this case, a differential gear would have to be used in order to divert the workpiece rotating movement from the tool rotating movement and rotating movement of the feed motor.

Another possibility consists of driving only the tool which, in its turn, drives the workpiece through the tooth engagement whereby the additional rotating movement is then produced by means of a braking torque on the workpiece. Instead of driving the tool, only the workpiece could be driven in an analogous manner.

In a particular advantageous design, both tooth flanks of the workpiece can be simultaneously machined with two tools which, for example, are diametrically opposite each other, whereby the circular feed movement is effected by means of additional rotating movements of the tools. When the workpiece is subject to lower requirements, its drive an be eliminated whereby the rotation of the workpiece is effected by the tools through the tooth engagement. The workpiece is, in this case, "clamped" in a certain way between the tools.

The machining process according to the invention is not restricted to the grinding of spur gear with a grinding worm. It covers quite generally the machining of workpiece by means of a cutting, removing or re-shaping profiling or trimming tool. If the workpiece is not to be machined in the bottom of the gap, the base circle diameter of the profiling tool must be larger than that of the workpiece.

The following possibilities are, for example, under consideration:

(1) The tool has a globoidal or hyperboloid-like shape dependent on the externally toothed workpiece to be machined and is a threaded or worm-shaped grinding or honing wheel provided with external toothing.

(2) The tool has a barrel shape dependent on the internally toothed woripiece to be machined and is a threaded or wormshaped grinding or honing wheel provided with external toothing.

(3) The tool has a globoidal or hyperboloid-like shape dependent on the externall toothed workpiece to be machined and is an externally toothed scraping or honing gear wheel.

(4) The tool has a globoidal or hyperboloid-like shape dependent on the externally toothed workpiece to be machined and is an internally toothed scraping or honing gear wheel or an internally toothed grinding worm.

(5) The tool has a barrel shape dependent on the internally toothed workpiece to be machined and is an externally toothed scraping or honing gear wheel.

(6) A cylindrical or crowned dressing gear wheel is used for the dressing of the tool with a cutting, removing or reshaping surface whereby the shape of this dressing gear wheel corresponds to the desired geometry of the tool to be produced with the exception of the width which is either somewhat larger or somewhat smaller in the case of the profiling tool and is simulated as a larger width by an axial shifting of the profiling tool during profiling with a simultaneous rotation considering the angle of the tooth.

The process according to the invention is also suitable for the production of a workpiece which has not been preliminary toothed. For this purpose, the tool and the workpiece are moved in radial direction towards each other while removing or dislodging material until the rated axis distance is reached whereupon the continued machining or final machining is effected by means of the above described relative circular feed movements.

While the invention has been particularly shown and described with reference to preferred embodiments thereof it will be understood by those in the art that the foregoing and other changes in form and details may be made therein without deparing from the spirit and scope of the invention.

What is claimed is:

1. A process for machining the teeth of a rotating gear workpiece by means of at least one rotating worm-shaped tool which can be moved toward engagement with the workpiece and upon reaching the desired distance between the axes of the tool and workpiece will rest against the workpiece with the ratio of the revolutions corresponding to a basic revolution ratio resulting from the ratio of the number of teeth of the workpiece and tool, comprising radially feeding said tool having a curved tooth thickness smaller than the final measurement of the width of the curved tooth gap of the workpiece to be produced relative to said workpiece until the desired distance between said axes is reached without contact and subsequently performing a controlled relative circular feed movement comprised of an additional rotating movement of one of said workpiece and tool which is superimposed on the corresponding basic revolution so that at least one flank of each tooth of said workpiece is machined, said circular feed movement being continously measured during the machining operation and stopped upon reaching a predetermined feed angle.

2. A process according to claim 1 further comprising machining said one workpiece flank during a roughing feed increment, a smoothing feed increment and a feed dwell at the final position during at least one workpiece rotation and subsequently reversing and analogous machining the other workpiece flank.

3. A process according to claim 2 wherein the roughing and smoothing feed increments are effected continuously.

4. A process according to claim 1 wherein said additional rotating movement of the tool and of the workpiece is implemented by means of an electronic control and regulating system whereby the tool and the workpiece are each driven by a separate motor.

5. A process according to claim 1 wherein both flanks of the workpiece teeth are machined simultaneously by using two tools whereby circular feed movement is effected by means of additional rotating movements of said tools.

* * * * *